United States Patent [19]
Le Roux

[11] Patent Number: 5,227,612
[45] Date of Patent: Jul. 13, 1993

[54] METHOD AND DEVICE FOR THE MANAGEMENT OF TRANSACTIONS USING MICROCHIP CARDS

[75] Inventor: Jean-Yves Le Roux, Bouc Bel Air, France

[73] Assignee: Gemplus Card International, Gemenos, France

[21] Appl. No.: 647,519

[22] Filed: Jan. 28, 1991

[30] Foreign Application Priority Data

Jan. 30, 1990 [FR] France .................... 90 01073

[51] Int. Cl.$^5$ .................................... G06F 15/30
[52] U.S. Cl. .................. 235/379; 235/380; 235/492; 902/26
[58] Field of Search ............ 235/380, 492, 379; 902/26

[56] References Cited

U.S. PATENT DOCUMENTS 4,001,550 1/1977 Schatz .
4,859,837 8/1989 Halpern .

FOREIGN PATENT DOCUMENTS 0247623 9/1984 European Pat. Off. .
0232058 12/1987 European Pat. Off. .

Primary Examiner—Harold Pitts
Attorney, Agent, or Firm—Roland Plottel

[57] ABSTRACT

The method for the management of transactions in a system including card readers and the associated microcircuit cards consists in organizing the memory of the cards, designed for the recording of the transactions, in two zones, one zone that is accessible through the presenting of the bearer code at each transaction, for the transactions involving sums above a predetermined value, the other zone being accessible for the transactions involving sums that are below the predetermined value, without any systematic presenting of the bearer's code: a presenting of the bearer's code commands the writing of opening bits of recording spaces in this second zone until the number of open spaces is equal to N which is a predetermined value. The disclosed method can be applied, notably, to credit cards, telephone cards and multiple-use cards.

9 Claims, 2 Drawing Sheets

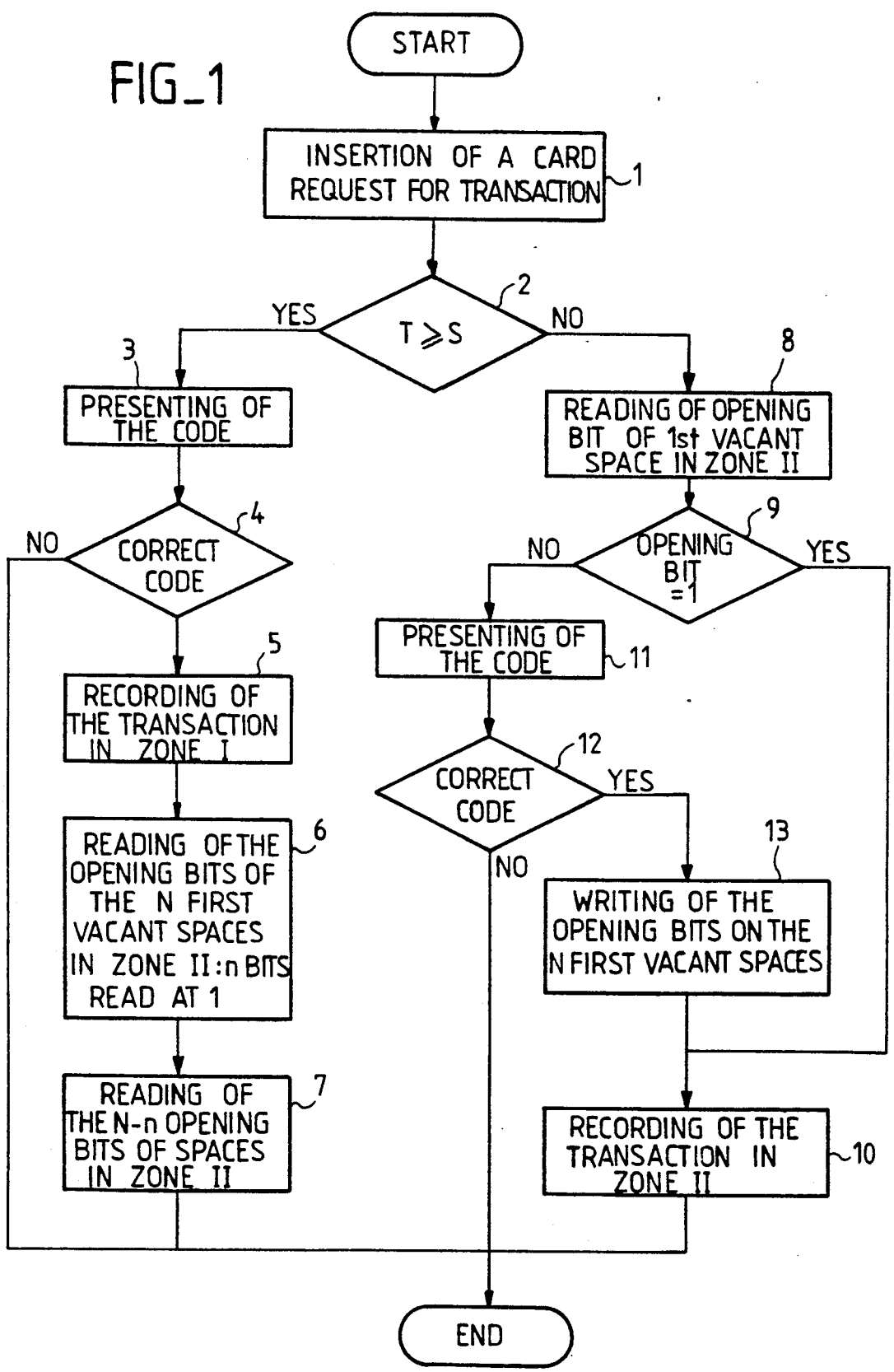

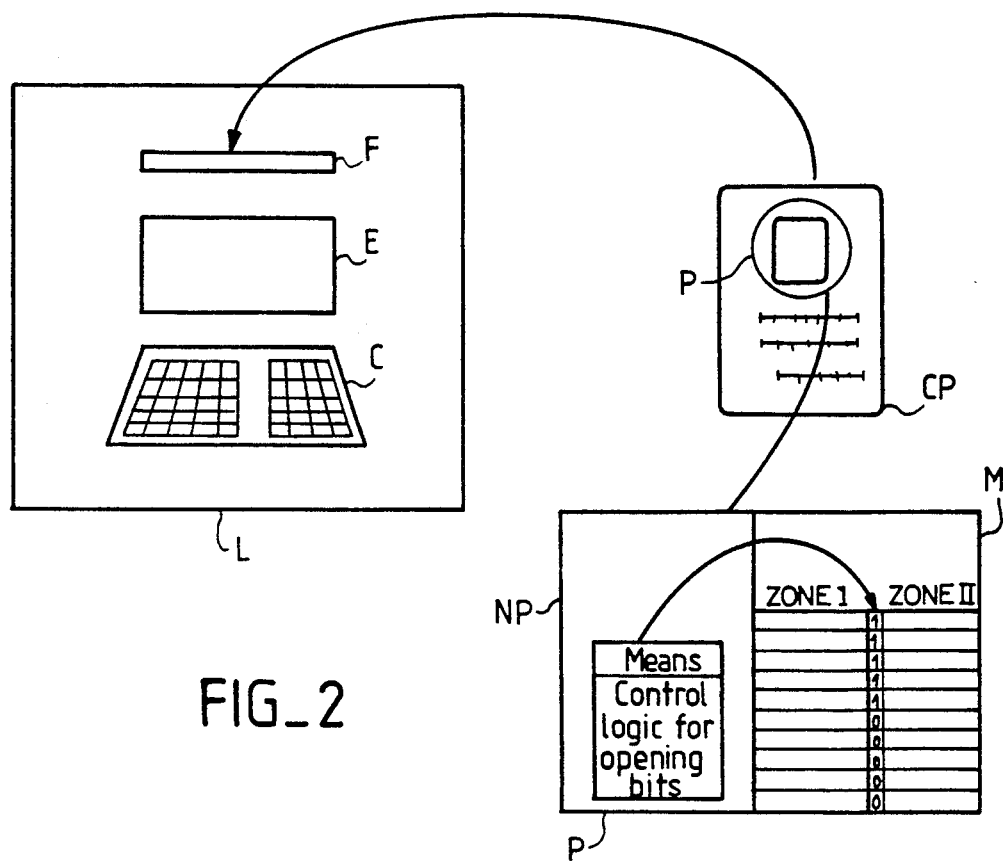
FIG_2
FIG_3-a
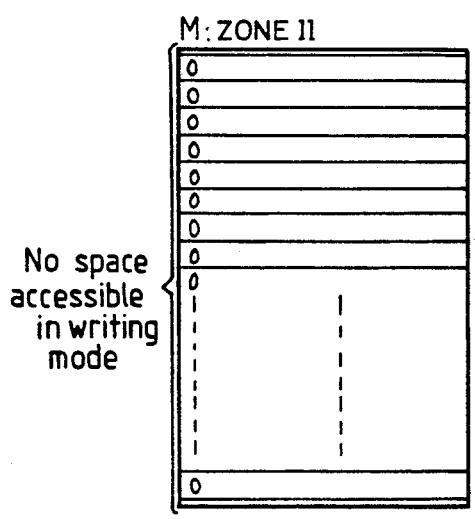
FIG_3-b
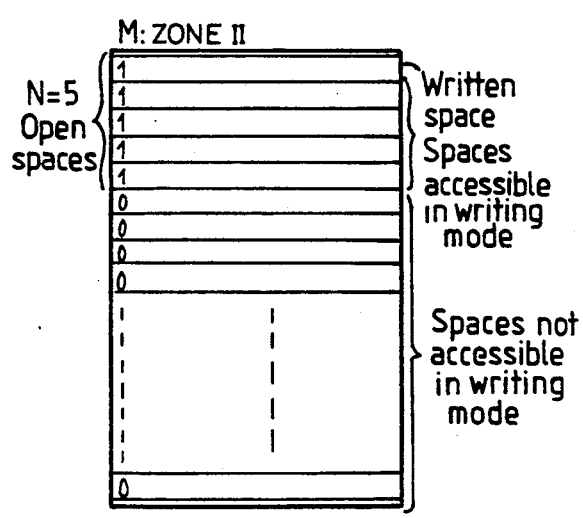

METHOD AND DEVICE FOR THE MANAGEMENT OF TRANSACTIONS USING MICROCHIP CARDS

BACKGROUND OF THE INVENTION

1. Field of the Invention

The invention relates to the field of systems of transactions using microcircuit circuits and, more particularly, to a method and to a corresponding device for the management of transactions, using such cards.

2. Description of the Prior Art

Microcircuit cards are conventionally used in systems of banking transactions. For transactions of this type, the use of the card in a reader makes it necessary to present a confidential code, which is the bearer's own code, to this reader, authorizing the transaction to be carried out once it involves a sum of money. In other applications, this confidential code may not have to be presented, notably if these applications do not bring the microcircuit into play and if the only operation used is the reading of a magnetic track on the card. However, at present and in general, once the required application uses the microcircuit, notably to record a transaction in a memory space designed for this purpose, the bearer's code is presented systematically, irrespectively of the sum of money involved in the transaction.

A system such as this enjoys total security but obviously has the drawback of being cumbersome and tedious to use when the sum involved in the transactions is small: although the presenting of the confidential code can be envisaged for large sums of money and although we can appreciate the security that must surround these large sums, it would appear that the systematic presenting of the confidential code for purchases involving small sums is disproportionate to the corresponding risk.

Consequently, for the multiple-use cards that are likely to be developed in the future, notably for credit cards, telephone cards etc., it would be appropriate to have different ways of processing transactions involving large sums of money and those involving only small sums.

SUMMARY OF THE INVENTION

An object of the invention is a method, and a corresponding device, for the management of transactions using microcircuit cards, making it possible to avoid the systematic presenting of the confidential code by the bearer for transactions which, it has been estimated beforehand, are of small importance while at the same time preserving adequate security for the bearer, in achieving this goal by sufficiently simple means.

According to the invention, there is provided a method for the management of transactions in a system implementing card readers and associated microcircuit cards, the bearers of which are recognized by the system by means of confidential bearer codes, wherein said method consists in organizing the memory space of the cards designed for the recording of the transactions in at least one zone that is accessible without the systematic presentation of the bearer's code for transactions, and wherein the presenting of the code by a bearer activates the writing of opening bits of recording spaces, in this zone, until the number of open spaces is equal to a predetermined number N, N being greater than or equal to 2.

Another object of the invention is a device designed to implement this method.

BRIEF DESCRIPTION OF THE DRAWINGS

The invention will be understood more clearly and other characteristics will appear from the following description, made with reference to the appended figures.

FIG. 1 is a flow chart of an example of the method of management according to the invention;

FIG. 2 gives a schematic illustration of the device designed for its implementation, according to the invention;

FIGS. 3a and 3b illustrate the memory zone used for transactions involving sums that are below a threshold, respectively before and after the presenting of the bearer's code.

DETAILED DESCRIPTION OF THE INVENTION

As indicated here above, the method according to the invention is such that the presenting of the bearer's confidential code to the card reader gives the bearer the possibility of enjoying a number N of "rights" without his having to present his code at each instance of "consumption" of this right $N >= 2$: for example, the bearer may enjoy $N=5$ monetary transactions for sums of less than 100 dollars each after each instance when the code has been presented.

To this end, the microcircuit makes it possible to route the recording of the corresponding transactions (for example, transactions of less than 100 dollars) towards a zone having a finite number of spaces for the recording of data, and the method according to the invention provides, during the constitution of the microcircuit card, for a bit that is initially at 0 at the head of each recording space and is liable to change its value to signify the opening of the corresponding recording space upon a command programmed in the microcircuit as soon as the card is constituted.

This command, which is activated by the presenting of the bearer's code, opens the hitherto unused recording spaces until the number of open spaces is equal to N (5 for example).

Thus, at the first use of a new card, the reader asks for the confidential code to be keyed in and, after this code has been received and validated by the circuit, this circuit transmits a command which, firstly, provides for access to the transactions memory zone, hereinafter called ZONE I, designed for the transactions involving large sums of money, and secondly, reverses the header bits of N spaces of recordings in the transactions memory zone, hereinafter called ZONE II, designed for the transactions involving small sums of money. The effect of this is that the rights corresponding to these N spaces are obtained without the code's being keyed in again.

If the next transaction is a transaction for a large sum, the recording takes place in the corresponding zone and none of the N open spaces is used up. If the transaction is for a small sum, the recording takes place in one of the N open spaces, and N−1 spaces remain available for the following transactions for small sums.

At the next instance of use, the bearer will not be asked for the code, through the card reader, so long as the transactions continue to involve small sums and so long as the open recording spaces have not all been used.

By contrast, the code will be again be asked for, either when the sum of the transaction is large or for a transaction involving a small sum when all the open spaces have been used. In both these cases, the keying in of the code will activate the opening of recording spaces in the memory zone allocated to transactions for small sums, to open N new spaces. This is designed for use in the latter case, when previously opened spaces have been used up.

FIG. 1 exemplifies a flow chart of the method for the management of transactions according to the invention, described here below.

After the initial step 1 for the insertion of the card into the reader and for requesting a transaction through the keypad of the reader, the reader asks for the code to be presented (step 3) if the sum of the requested transaction T corresponds to a value greater than or equal to a pre-determined threshold value S during a test (step 2). A test on the value of the code (step 4) authorizes the recording of the transaction in ZONE I (step 5) if the code is correct, and rejects the transactions (to END) if the code is incorrect.

The reader has the option of not taking account of this transaction recorded in ZONE I for the management of ZONE II and the operation is then terminated.

In the preferred embodiment, corresponding to the flow chart of FIG. 1, when the bearer's code has been correctly presented, the reader commands the reading of the opening bits of the first N vacant spaces in ZONE II (step 6). If n opening bits out of the N bits read are at 1 then, by programmed logic within the microcircuit or by wired logic, the following $N-n$ bits are set at 1 (step 7). The operation is then terminated.

When the requested transaction involves a sum of less than S, during the test of the step 2, the reader activates the reading of the opening bit of the first vacant space in ZONE II (step 8) then tests its value (step 9). If the bit is at 1, the transaction is immediately recorded (step 10) in the corresponding space in ZONE II.

By contrast, if this bit is still at 0, the reader asks for the bearer's code to be keyed in (step 11) and ascertains that it is correct (step 12). If the code is not correct, the transaction is rejected (to END). If the code is correct, the reader, through the internal logic of the card, orders the launching of the operation for the writing, at the value 1, of the opening bits of the N first vacant spaces in ZONE II (step 13), then the recording of the transaction (step 10) in the first open space in ZONE II.

FIG. 2 is a diagram of the device designed to implement the above-described method. It has a reader L with a slot F designed for the insertion of a microcircuit card CP, its screen E and its keypad F for interactive dialog between the reader L and the bearer of the card. A card CP includes the microcircuit P and, as the case may be, magnetic tracks and/or clear inscriptions. The microcircuit P has the microprocessor $\mu p$ including, in the form of a pre-recorded and inaccessible program, logic means for the control of the opening bits, and a non-erasable EPROM or EEPROM type associated memory space M, having transaction recording zones I and II, each including predefined recording spaces. In each recording space of the ZONE II, at the head, there is provided the opening bit, which is initially at 0 and is capable of being set at 1 by an internal command from the microcircuit.

The FIGS. 3a and 3b illustrate the memory zone II, respectively before the bearer's code is presented, when no space is accessible for writing, and after the bearer's code is presented, following a request for a transaction for a sum below the threshold S, the first space having received the recording of the corresponding transaction in an embodiment where N has been chosen to be equal to 5: four spaces remain available for writing without a presentation of the code, and the following spaces remain inaccessible for writing.

The advantage of the method for the management of transactions according to the invention is that the security of the transactions remains the same as in prior systems for transactions involving big sums through the systematic presentation of the bearer's code, but that, simultaneously, transactions for small sums can be carried out notably by reducing the number of instances when the bearer's code is presented without, however, leaving the corresponding zone completely open, this feature being designed to prevent fraud, notably in the case of the loss or theft of the card. The sum corresponding to a fraudulent act is, at the most, equal to N.S.

The invention is not limited to the embodiment precisely described and shown herein. In particular, it is possible to provide for a partition of the memory of the card into a greater number of zones, for example three zones, by providing for a second threshold value $S' < S$, where the presenting of the code enables the opening of a greater number of recording spaces in the third zone, for example $N'$ spaces, but does so for transactions of small sums, namely sums smaller than $S'$: the zone II is then reserved for transactions involving sums between S and $S'$.

Furthermore, the order of the steps in the flow chart of the FIG. 1 is given only by way of example: as indicated above, the steps 6 and 7, which enable the number of spaces open in ZONE II to be brought up to N, after the presenting of the code for a transaction involving a large sum recorded in ZONE I, may be eliminated or carried out after step 5 of the recording in ZONE I.

In another improvement, the number N is a random number equal to 0 or 1, according to the result of a draw. This draw may be organized in the reader or in the program of the card, by means an algorithm automatically applied for this purpose by this reader or this card when the card is introduced into this reader. When the result of the draw is 0, the keying in of the secret code is requested. When N equals 1, this is dispensed with. This mode may, of course, be coupled with the function of the threshold of permitted expenditure. That is, this random draw concerns only expenditure involving small sums. For large sums, the reader must always be given the secret code. Instead of being random, the draw may also be pseudo-random if the algorithms used for the draw are easier to apply in the limited memory of the card.

What is claimed is:

1. A method for the management of transactions in a system, said system including card readers and microcircuit cards associated with said card readers, users of said microcircuit cards being recognised by said system by means of confidential user codes, wherein said method comprises the following steps:

designing a memory space in a microcircuit of said microcircuit cards for the recording of a transactions, organizing, within said memory space, at least a first zone that is accessible for recording said transactions without a systematic presenting of the user code, designing in said at least first zone recording spaces devoted each for the recording of one of said transactions, writing opening bits, in a first state, for opening a predetermined number N of said recording spaces thus allowing the recording of N transactions in said open recording spaces, N being greater than or equal to 2, said opening bits being associated with said recording spaces, recording an actual transaction in an open recording space while changing the state of the opening bits associated with the corresponding recording space, as and when available opening bits exist, presenting a user code by a user, when there is no more available opening bits, in order to write a new set of opening bits associated with N other designed recording spaces in order to open said N other recording spaces.

2. A method according to claim 1, further comprising the following steps:

organizing within said memory space at least two distinct zones accessible for recording said transactions, a first zone that is accessible for recording a first type of transaction, by the presenting of code according to the mode of claim 1, and a second zone accessible for a second type of transaction, by the presenting of the code at each transaction, directing, by the reader, the recording of an actual transaction towards the first zone or the second zone depending on whether the sum that said actual transaction represents is smaller than or greater than a predetermined threshold.

3. A method according to claim 1 or claim 2 wherein, after each transaction for which the card reader requests the keying in of the user code when there are no longer any open recording spaces in the corresponding zone, the keying in of the code in this case again activating a writing of N opening bits for opening N new unrecorded recording spaces following these recording spaces already used in this zone.

4. A method according to claim 2, comprising the step of keying in said user code when an actual transaction involves a sum above the threshold, - recording said actual transaction in the second zone, reading the opening bits available for recording transactions in unrecorded recording spaces following those recording spaces already used in the first zone, and writing opening bits corresponding to recording spaces, until N, that have not yet been open.

5. A device for the management of transactions designed for the implementation of the method according to any of the claims 1 or 2 comprising, in the microcircuit of said microcircuit cards, inaccessible logic means from the card reader that control the writing of the opening bits for opening said recording spaces in the first zone, said memory space being of the EPROM type, or of the EEPROM type used as an EPROM, that is recordable and unerasable.

6. A device according to claim 5, wherein said logic means for controlling the writing of opening bits for opening said recording spaces comprise a program prerecorded in the microcircuit.

7. A device according to claim 5, wherein said logic means for controlling the writing of opening bits for opening said recording spaces are constituted by a logic circuit.

8. A method for the management of transactions in a system, said system including card readers and microcircuit cards associated with said card readers, users of said microcircuit cards being recognised by said system by means of confidential user codes, wherein said method comprises the following steps:

designing a memory space in said microcircuit of said microcircuit cards for the recording of said transactions, organizing, within said memory space, at least a first zone that is accessible for recording said transactions without systematic presenting of the user code, designing in said at least first zone a recording space devoted for the recording of an actual transaction, drawing of lots, presenting the user code by a user being made necessary according to a result of said drawing of lots.

9. A method according to claim 8, further comprising the step of:

organizing within said memory space at least two distinct zones accessible for recording said transactions, a first zone that is accessible for recording a first type of transaction, by the presenting of the user code according to the mode of claim 8, and a second zone accessible for a second type of transaction, by the presenting of the user code at each transaction, directing, by the reader, the recording of an actual transaction towards the first zone or the second zone depending on whether the sum that said actual transaction represents is smaller than or greater than a predetermined threshold.

* * * * *